United States Patent Office 3,402,137
Patented Sept. 17, 1968

3,402,137
METHOD OF PREPARING AQUEOUS
POLYMER SOLUTIONS
Paul W. Fischer, Whittier, and Julius P. Gallus, Anaheim, Calif., assignors to Union Oil Company of California, Los Angeles, Calif., a corporation of California
No Drawing. Filed Feb. 1, 1966, Ser. No. 523,929
22 Claims. (Cl. 260—29.6)

ABSTRACT OF THE DISCLOSURE

An acrylamide polymer composition having improved water dispersibility and a method of improving the dispersibility of water-soluble polymers in aqueous liquids by admixing with the particulated solid polymer a solid, water-soluble dispersant.

---

This invention relates to a method of preparing aqueous solutions of water-soluble polymers, and more particularly, to an improved method of dissolving high molecular weight water-soluble polymers in aqueous media. In another aspect, this invention relates to solid polymer compoistions having improved water dispersibility.

Various water-soluble polymers have been developed which in aqueous solution exhibit superior thickening and flocculating properties. These polymers are being increasingly used in a number of commercial applications, such as for example in the clarification of aqueous solutions of uranium salts, in sizing paper and textiles, in the treatment of sewage and industrial wastes, as stabilizers for drilling muds, and in the secondary recovery of petroleum by water flooding. While various natural water-soluble polymers and gums have long been used, some of the more recently developed synthetic polymers are desirable because of their greater uniformity and further because substantial thickening can be achieved at relatively low polymer concentrations.

Although these polymers are most often available commercially as powders, or otherwise in finely divided solid form, they are usually most advantageously utilized in aqueous solution. Accordingly, the solid polymer material must be dissolved in water. Although the various polymers are more or less soluble in water, difficulty is often experienced in preparing aqueous polymer solutions because of the slow dissolution rate of many of these polymers and because the solid polymer is not readily dispersible in water.

Dispersion of solid polymer in water is hindered by the tendency of the solid to cake on contact with water. Lumps of solid material are formed by the encapsulation of undissolved solid in an outer coating of water wet polymer which retards the penetration of additional water into the agglomerate. Although many of these lumps are finally dissolved by continued agitation, it is frequently impractical to agitate the solution for a sufficiently long period to obtain complete dissolution. In many applications solids cannot be tolerated. Thus, the residual polymer solids must be removed by a separate filtration step. Not only does poor dispersion of the polymer require an additional filtration step, and result in waste of the undissolved polymer, but also the final solution is less beneficially treated.

Heretofore various dispersion apparatus have been proposed to effect dissolution of the solid polymer. Several of these devices function by creating a vortex into which the polymer solid is added in sufficiently small quantities that dispersion is substantially effected without agglomeration or lumping. However, even with the best of such devices, dissolution of the polymer is time consuming and a certain amount of agglomeration occurs, thus necessitating additional filtration to assure a solids-free aqueous polymer solution.

Most aqueous solutions of these polymers are non-Neutonian liquids exhibiting pseudo plastic flow under conditions of shear. Because of this characteristic, certain of these polymers, such as the polyacrylamides, have been adapted to thickening of aqueous liquids employed in various well stimulation and secondary recovery processes. When these polymers are dissolved in water, the apparent viscosity of the solution is sharply increased, even in rather dilute solution; the viscosity of the aqueous solution containing a given quantity of polyacrylamide being a function of the molecular weight of the polymer. However, the preferred high molecular weight acrylamide polymers are difficult to dissolve in water, particularly under field conditions encountered at the well site, due to the above-described tendency of the particulated solid polymer to agglomerate on contact with water. Further, not only is the preparation of these aqueous polymer solutions time consuming and the beneficial effect of the polymer diminished by poor dispersion of the solid, but injection of solid polymer into a producing formation can result in permanent plugging of the structure.

Accordingly, it is an object of the present invention to provide a method for improving the dispersion of solid water-soluble polymer in aqueous media. Another object of the invention is to provide an improved method of effecting dissolution of solid water-soluble polymers in water. Another object is to provide a method of reducing the tendency of finely divided solid polymer to agglomerate on contact with water. Still another object is to provide a method of enhancing the beneficial effect imparted to water by dissolved water-soluble polymers. A further object is to provide a solid water-soluble composition having the property of improved water dispersibility. An even further object is to provide a solid water-soluble polymer composition which is completely soluble in an aqueous solvent. A still further object is to provide a composition useful in the secondary recovery of petroleum. Other objects and advantages of the invention will be apparent to those skilled in the art from the description thereof which follows.

According to the method of this invention, various solid water-soluble polymers are rendered readily soluble in aqueous liquids by admixing the polymer with a specially selected water-soluble solid dispersant prior to addition of the solid composition into the aqueous medium. The solid dispersant is primarily selected for the properties of water solubility and ability to prevent agglomeration or caking of the comixed solid polymer particles on contact with the aqueous solvent. The admixed dispersant improves the solubility rate of the polymer and further, promotes substantially complete dissolution of the polymer in the liquid. Thus, suitable aqueous solutions of water-soluble solid polymers can be prepared in simple apparatus with a minimum of mixing and since the dispersant is also water soluble, the resulting polymer solution is substantially completely free of undissolved solid material. For most purposes, the dissolved dispersant will not adversely affect the resulting aqueous polymer solution, particularly in the small amounts usually necessary for solubilization of the polymer.

While any water-soluble solid material having the requisite solubility and dispersing capability, and which can be admixed with solid water-soluble polymer materials to form a particulated solid composition, are within the scope of this invention, certain water-soluble solid acids and acid salts are particularly useful as polymer dispersants.

The solid water-soluble acids suitable for use as polymer dispersants include solid polybasic carboxylic acids, and particularly solid polybasic aliphatic carboxylic acids. Characteristic of the polybasic aliphatic carboxylic acids useful as dispersants for various water-soluble polymers are dibasic aliphatic carboxylic acids of the oxalic acid series, such as, for example, oxalic acid, malonic acid, succinic acid, glutaric acid, adipic acid, pimelic acid, suberic acid, azalaic acid and sebacic acid.

Also useful as polymer dispersants are solid aliphatic hydroxy carboxylic acids including substituted monobasic, dibasic and tribasic aliphatic carboxylic acids containing one or more hydroxyl radicals. Of these, the monobasic hydroxy acids, such as glycollic acid, the dibasic hydroxy acids, such as malic acid; the tribasic hydroxy acids, such as citric acid; and the dibasic polyhydroxy acids, such as, for example, tartronic, tartaric, ribosic and saccharic acids are particularly effective dispersants for water-soluble solid polymers in aqueous media.

Another class of water-soluble solid acids effective in dispersing solid water-soluble polymers in aqueous media are the acid salts of an alkali metal, such as the alkali metal bisulfates, bicarbonates, and monoacid and diacid phosphates. Of these useful acid salts, the alkali metal bisulfates are preferred. Particular alkali metal bisulfates useful as dispersants are sodium bisulfate and potassium bisulfate.

Any of the aforementioned water-soluble solid acids can be employed singly to impart the desired property of improved dispersibility to a water-soluble polymer, or two or more of these dispersants can be employed in combination to achieve even increased dispersibility. Thus, it is within the scope of the present invention to admix solid water-soluble polymer with one or more of the foregoing water-soluble solid acids to improve the dispersibility of the polymer in aqueous media.

Also, the foregoing water-soluble solid acids can be effectively combined with other water-soluble solid constituents which synergistically operate to achieve improved dispersibility or to effect improvement in other desirable properties of the polymer solution, such as in the magnitude of viscosity increase imparted to the solution by the dissolved polymer. These additive materials can include solid water-soluble ingredients of both organic and inorganic derivation. One preferred polymer dispersant is a mixture of the aforementioned water-soluble solid acid and a solid polyethylene glycol characterized by the following generalized formula:

$$HOCH_2(CH_2OCH_2)_xCH_2OH$$

where $x$ is an integer having the value of at least 19, and which is further characterized by molecular weights of at least about 900. A particularly preferred polyethylene glycol is characterized by the above formula wherein the value of $x$ is about 135 and which is further characterized by a molecular weight of at least about 6000.

Still another class of water-soluble solids exhibiting good polymer dispersant properties in admixture with a water-soluble solid acid are copolymer polyoxypropylene and polyoxyethylene represented by the generalized formula:

$$HO(C_2H_4O)_a(C_3H_6O)_b(C_2H_4O)_cH$$

wherein $a$, $b$ and $c$ are integers. Preferred copolymers of this class are characterized by molecular weights within the range of from about 800 to about 2500 and by polyoxyethylene contents of above about 60 percent by weight. A particularly preferred copolymer material contains approximately 80 percent by weight polyoxyethylene within the polymer molecule and is characterized by a molecular weight within the range of from about 1500 to about 1800.

Mixtures of various high polymer polyvinyl alcohols and at least one of the aforementioned water-soluble acids are effective dispersants. These polyvinyl alcohols can be classified broadly as polyhydric alcohols with secondary hydroxyl groups on alternate carbon atoms. Particularly suitable polyvinyl alcohols are solids having molecular weights within the range of from about 170,000 to about 220,000. Polyvinyl alcohols are conventionally produced by catalytic alcoholization of polyvinyl acetate. Preferred polyvinyl alcohols for use as polymer dispersants are characterized by a relatively high degree of hydrolysis with generally in excess of about 40 percent of the available acetate radicals being hydrolyzed to hydroxyl radicals, and desirably with over 80 percent hydrolysis. Preferred polyvinyl alcohols are further characterized by viscosities of at least 35 centipoises for a 4 percent by weight solution in water.

No matter which of the disclosed polymer or dispersant mixtures is employed, the technique of achieving dispersion of the water-soluble polymer in an aqueous solvent is substantially similar. Dispersion of the polymer is effected by first preparing a mixture of finely divided solid polymer and dispersant, and then simply admixing these solids and aqueous solvent in any convenient manner. The solid mixture of polymer and dispersant are readily dispersed in the aqueous solvent media with a minimum of agitation. In this dispersed phase, the polymer is dissolved without the formation of lumps or agglomerates normally associated with this operation. Most water-soluble solid polymers are easily dispersed in aqueous media by the addition of 20 to 100 parts by weight of total dispersant for each 100 parts of polymer solids. Where a dispersant mixture is to be employed, the total of the dispersant mixture is desirably within these proportions with the acid ingredient of the mixture amounting to a minimum of at least about 5 parts by weight.

The aqueous solvent in which the water-soluble polymer is dissolved can be water base solvent of any suitable type including water, distilled water, deionized water, aqueous salt solutions, aqueous acid solutions, aqua ammonia, aqueous base solutions, and the like.

A principal advantage of the dispersion method of this invention is that a highly dispersible polymer composition can be prepared in advance of usage, and stored as a particulated solid until needed. Aqueous polymer solutions can then be readily obtained by admixing the proper proportions of this composition with aqueous solvent.

The dispersible polymer compositions of this invention can be prepared by any convenient method which yields a finely divided solid mixture of water-soluble polymer and dispersant. One simple method of preparation is to separately grind each of the solid ingredients and admix the resulting finely divided solids in the proper proportions. Alternatively, the solid polymer and the dispersant can be combined in proper proportion and ground to obtain the requisite particulated mixture of solids. In another method of preparing the foregoing solids mixture, the dispersant is dissolved in a suitable volatile solvent in which the polymer is insoluble. The polymer solid is slurried into the solution, which is then evaporated to dryness. The remaining solids are then ground to obtain the particulated solids mixture. Similarly, the solid ingredients can be combined in molten form and solidified to form a particulated solid mixture, or a solid mass which then can be ground. In any case, it is desirable that the resulting dispersible polymer composition be relatively finely divided to promote dispersion and dissolution of the polymer. It is generally desirable that the solids pass a 30 mesh screen, although larger particles can be satisfactorily employed in many applications.

The solubilizing technique of this invention is applicable to the preparation of aqueous solutions of any of a variety of solid, water-soluble polymers. While this method can be employed to prepare aqueous solutions of any water-soluble polymer, it is directed to the preparation of aqueous solutions of those water-soluble polymers which are difficultly dispersible in aqueous media. Among the various water-soluble polymers rendered more readily dispersible by admixture with one or more of the aforementioned dispersants are both those of natural and synthetic origin. Generally, the dispersibility of polymers having molecular weights of from about 30,000 up to 40,000,000 or more can be improved by the method of the invention. Since the difficulty of dissolving these materials increases with the molecular weight of the polymer, the disclosed dispersants usually exhibit greater beneficial effect with the higher molecular weight polymers.

While the foregoing method of solubilizing difficultly dispersible water-soluble polymers can be used in preparing aqueous polymer solutions useful in a variety of applications, the method of this invention has particular application in the preparation of aqueous polyacrylamide solutions useful in the secondary recovery of petroleum by water flooding, hydraulic fracturing, and similar techniques wherein viscous water is injected through a well and into contact with a subterranean formation penetrated by the well. In such applications, the aqueous acrylamide solution can be easily prepared in conventional mixing equipment at the well site with the dispersible compositions of this invention.

One class of water-soluble polymer to which the solubilizing technique of this invention is particularly suited is a solid acrylamide polymer having a molecular weight in excess of 30,000. The terms "acrylamide polymer" and "polyacrylamide," as employed herein, are inclusive of the hydrolyzed and partially hydrolyzed polyacrylamides having all or a portion of the carboxamide groups hydrolyzed to carboxyl groups, and of the modified polymers wherein the carboxyl groups are in the acid form and also of such polymers wherein the carboxyl groups are in the salt form, provided that the salts are water soluble. Thus, for example, the polyacrylamide can be employed in the form of sodium, potassium, or other alkali metal salts, the ammonium salt or mixed salts of sodium, potassium, and the like. Salts of polyvalent ions, such as iron and aluminum, are to be avoided for reasons of insolubility. The terms "acrylamide polymer" and "polyacrylamide" as employed herein, are also inclusive of homopolymers of acrylamide or copolymers thereof with other suitable polymerizable compounds such as vinyl acetate, acrylonitrile, methacrylontrile, vinyl alkyl ethers, vinyl chloride, and the like, provided that the copolymers so employed are characterized by water solubility.

Particular acrylamide polymers known to possess advantageous properties for preparing viscous aqueous compositions for use in the secondary recovery of petroleum and which can be solubilized by the method of this invention are high molecular weight hydrolyzed polyacrylamides having from about 12 to about 67, and preferably from about 12 to about 45 mole percent of the original carboxamide groups hydrolyzed to carboxyl groups, including modified polymers wherein the carboxyl groups are in the acid form and also wherein the carboxyl groups are in the form of water-soluble salts.

These preferred hydrolyzed polyacrylamides are characterized by a molecular weight of at least 500,000 and molecular weights of 1,000,000 or more are preferred. The viscosity of a standard solution of polymer under controlled conditions is correlated with the molecular weight of the polymer. Accordingly, it has been found that the hydrolyzed polyacrylamides suitable for use in the invention are those characterized by a viscosity of at least 6 centipoises for a 0.5 percent by weight solution thereof in aqueous 4 percent by weight sodium chloride solution at a temperature of 25° C. as determined with an Ostwald viscosimeter.

The following examples are illustrative of various modes of practicing this invention, but are not to be construed as limitations thereof:

EXAMPLE 1

The difficulty encountered in preparing aqueous solutions of particulated, water-soluble solid polymer is demonstrated by adding powdered acrylamide polymer to water and observing the extent of polymer dissolution and the corresponding solution viscosity as a function of time. The particular polymer selected for this test is a partially hydrolyzed polyacrylamide marketed by the Dow Chemical Company under the trade designation ET-601.

The aqueous polymer solution is prepared in a mixing apparatus comprising a 1000 ml. beaker fitted with a propeller mixer operated at about 400 r.p.m. and a conventional Fann viscosimeter produced by the Fann Instrument Corporation. The Fann viscosimeter comprises two concentric cylinders of different diameters which form an annular space adapted to contain the test liquid. The outer cylinder is rotated at a speed of 600 r.p.m. Torque generated by the rotary motion of the outer cylinder is transmitted to the inner cylinder by the viscous drag of the liquid. Rotary motion of the inner cylinder is limited by a helical spring which balances the transmitted torque. The angular deflection of the inner cylinder is proportional to the viscosity of the liquid.

The test is performed by charging 800 ml. of water to the beaker and activating the mixer and the viscosimeter. A quantity of ET-601 powder is passed through a 30 mesh screen. After the system has reached equilibrium, 2.3 grams of the powder is added to the water in one single addition. This quantity of polymer is equivalent to a concentration of one pound of polymer per barrel of water. The appearance of the solution is noted at time intervals of 1, 3, 6 and 10 minutes following the addition of the polymer and the approximate number of solid or semisolid particles larger than ⅛-inch diameter is estimated at each of these times. The indicated viscosity is also noted. Following this first 10 minute period of agitation, mixing is discontinued and the solution allowed to stand at room temperature for an additional 50 minutes. The mixer and viscosimeter are again activated and the final results noted.

After the first minute of agitation, approximately 36 lumps of polymer solid larger than ⅛-inch diameter and many smaller particles are dispersed in the fluid. After 60 minutes, the fine particles are essentially completely dissolved, however, approximately 18 large particles or lumps remain undissolved. The viscosity of the solution is increased from 8 to 29 centipoises during this period. The complete results of the foregoing tests are recorded in Table A as test number 1.

EXAMPLE 2

Dow Chemical Company ET-601 polymer and solid sodium bisulfate are separately passed through a 30 mesh screen. A mixture of 100 parts by weight minus 30 mesh ET-601 polymer and 50 parts by weight of minus 30 mesh solid sodium bisulfate is prepared. The solubility of this solid mixture is determined by dissolving 3.45 grams of the mixture in 800 ml. of water according to the method of Example 1. The solid mixture of ET-601 polymer and sodium bisulfate exhibits excellent solubility with essentially no plus ⅛-inch lumps of solid being apparent after 1 minute of agitation. The results of this test are recorded in Table A as test number 2.

EXAMPLE 3

The polymer solubility test of Example 2 is repeated using 2.76 grams of a solid mixture of 100 parts by weight of minus 30 mesh ET–601 polymer and 20 parts by weight of minus 30 mesh sodium bisulfate. This mixture exhibits an excellent solubility characteristic with essentially no plus 1/8-inch lumps of solid polymer being apparent after 1 minute of agitation. Additionally, the resulting polymer solution exhibits a markedly increased viscosity. The results of this test are recorded in Table A as test number 3.

EXAMPLE 4

Dow Chemical Company ET–601 polymer and solid oxalic acid are separately passed through a 30 mesh screen. A mixture of 100 parts by weight of minus 30 mesh ET–601 polymer and 50 parts by weight of minus 30 mesh oxalic acid is prepared. The solubility of this mixture is determined by dissolving 3.45 grams of the solid mixture in 800 ml. of water according to the method of Example 1. The solid mixture of ET–601 polymer and oxalic acid exhibits excellent solubility with essentially no plus 1/8-inch lumps of solid polymer being apparent after 1 minute of agitation. The results of this test are recorded in Table A as test number 4.

EXAMPLE 5

Solid polyethylene glycol marketed by the Union Carbide Corporation under the trademark Carbowax 6000 is ground and passed through a 30 mesh screen. A solid mixture of 100 parts by weight of minus 30 mesh ET–601 polymer, 50 parts by weight of minus 30 mesh sodium bisulfate, and 50 parts by weight of minus 30 mesh Carbowax 6000 is prepared. The solubility of this mixture is determined by dissolving 4.6 grams of the solid mixture in 800 ml. of water according to the method of Example 1. The solid mixture of ET–601, sodium bisulfate and polyethylene glycol exhibits excellent solubility with essentially no plus 1/8-inch lumps of solid polymer being apparent after 1 minute of agitation. The results of this test are reported as test number 5 of Table A.

EXAMPLE 6

The test of Example 5 is repeated using 4.14 grams of a mixture of 100 parts by weight of minus 30 mesh ET–601 polymer, 30 parts by weight of minus 30 mesh sodium bisulfate, and 50 parts by weight of minus 30 Carbowax 6000 polyethylene glycol. This mixture exhibits excellent solubility with essentially no plus 1/8-inch lumps of solid polymer being apparent after 1 minute of agitation. The results of this test are reported in Table A as test number 6.

EXAMPLE 7

The test of Example 5 is repeated using 3.91 grams of a mixture of 100 parts by weight of minus 30 mesh ET–601 polymer, 20 parts by weight of minus 30 mesh sodium bisulfate, and 50 parts by weight of Carbowax 6000 polyethylene glycol. The solubility of the solid polymer is substantially reduced with three plus 1/8-inch lumps remaining after 60 minutes. The results of this test are reported in Table A as test number 7.

EXAMPLE 8

The test of Example 5 is repeated using 3.57 grams of a mixture of 100 parts by weight of minus 30 mesh ET–601 polymer, 5 parts by weight of minus 30 mesh sodium bisulfate, and 50 parts by weight of Carbowax 6000 polyethylene glycol. The solubility of the solid polymer is further reduced with six plus 1/8-inch lumps remaining after 60 minutes. The results of this test are reported as test number 8 of Table A.

EXAMPLE 9

Solid polyethylene glycol marketed by the Union Carbide Corporation under the trademark Carbowax 6000 is ground and passed through a 30 mesh screen. A solid mixture of 100 parts by weight of minus 30 mesh ET–601 polymer, 50 parts by weight of minus 30 mesh citric acid, and 50 parts by weight of minus 30 mesh Carbowax 6000 is prepared. The solubility of this mixture is determined by dissolving 4.6 grams of the solid mixture in 800 ml. of water according to the method of Example 1. The solid mixture of ET–601, citric acid and polyethylene glycol exhibits excellent solubility with no plus 1/8-inch lumps of solid polymer being apparent after 1 minute of agitation. The results of this test are reported as test number 9 of Table A.

EXAMPLE 10

The test of Example 9 is repeated using 3.57 grams of a mixture of 100 parts by weight of minus 30 mesh ET–601 polymer, 5 parts by weight of minus 30 mesh citric acid, and 50 parts by weight of minus 30 mesh Carbowax 6000 polyethylene glycol. This mixture exhibits excellent solubility with essentially no plus 1/8-inch lumps of solid polymer being apparent after 1 minute of agitation. The results of this test are recorded in Table A as test number 10.

EXAMPLE 11

Solid polyethylene glycol marketed by the Union Carbide Corporation under the trademark Carbowax 6000 is ground and passed through a 30 mesh screen. A solid mixture of 100 parts by weight of minus 30 mesh ET–601 polymer, 50 parts by weight of minus 30 mesh tartaric acid, and 50 parts by weight of minus 30 mesh Carbowax 6000 polyethylene glycol is prepared. The solubility of this mixture is determined by dissolving 4.6 grams of the solid mixture in 200 ml. of water according to the method of Example 1. The solid mixture of ET–601 polymer, tartaric acid and polyethylene glycol exhibits excellent solubility with essentially no plus 1/8-inch lumps of solid polymer being apparent after 1 minute of agitation. The results of this test are recorded in Table A as test number 11.

EXAMPLE 12

A mixture of 100 parts by weight of Dow Chemical Company ET–601 polymer, 50 parts by weight of solid sodium bisulfate and 50 parts by weight of Du Pont Elvanol polyvinyl alcohol, grade 50–42, is prepared, each component being first separately ground and passed through a 30 mesh screen. The solubility of this mixture is determined by dissolving 4.6 grams of the mixture in 800 ml. of water according to the method of Example 1. The solid mixture of ET–601 polymer, sodium bisulfate and polyvinyl alcohol exhibits excellent solubility with no plus 1/8-inch lumps of solid polymer being apparent after 1 minute of agitation. The results of this test are recorded in Table A as test number 12.

EXAMPLE 13

The test of Example 12 is repeated using a mixture of 100 parts by weight ET–601, 50 parts by weight solid sodium bisulfate and 50 parts by weight copolymer polyoxypropylene and polyoxyethylene marketed by Wyandotte Chemical Company under the trademark Pluronic F–68. This mixture exhibits excellent solubility with essentially no plus 1/8-inch lumps of solid polymer being apparent after 1 minute of agitation. The results of this test are recorded in Table A as test number 13.

TABLE A.—SUMMARY OF COMPARATIVE TEST RESULTS

| Test No. | Composition | Solubility Rate, Plus ⅛ inch Lumps at Indicated Time, Minutes | | | | | Fann Viscosity, Centipoises at 600 r.p.m. at indicated Time, Minutes | | | | |
|---|---|---|---|---|---|---|---|---|---|---|---|
| | | 1 | 3 | 6 | 10 | 60 | 1 | 3 | 6 | 10 | 60 |
| 1 | ET-601 polymer | 36 | 36 | 24 | 24 | 18 | 8 | 13 | 17 | 21 | 29 |
| 2 | 100 parts ET-601 polymer; 50 parts NaHSO₄ | Nil | Nil | Nil | Nil | Nil | 11 | 16 | 19 | 22 | 25 |
| 3 | 100 parts ET-601 polymer; 20 parts NaHSO₄ | Nil | Nil | Nil | Nil | Nil | 18 | 28 | 39 | 44 | 45 |
| 4 | 100 parts ET-601 polymer; 50 parts Oxalic acid | Nil | Nil | Nil | Nil | Nil | 7 | 8 | 10 | 10 | 11 |
| 5 | 100 parts ET-601 polymer; 50 parts NaHSO₄; 50 parts Carbowax 6000 | Nil | Nil | Nil | Nil | Nil | 10 | 15 | 20 | 24 | 27 |
| 6 | 100 parts ET-601 polymer; 30 parts NaHSO₄; 50 parts Carbowax 6000 | Nil | Nil | Nil | Nil | Nil | 11 | 19 | 22 | 28 | 32 |
| 7 | 100 parts ET-601 polymer; 20 parts NaHSO₄; 50 parts Carbowax 6000 | 6 | 3 | 3 | 3 | 3 | 10 | 15 | 19 | 24 | 29 |
| 8 | 100 parts ET-601 polymer; 5 parts NaHSO₄; 50 parts Carbowax 6000 | 50 | 24 | 15 | 6 | 6 | 9 | 14 | 18 | 21 | 25 |
| 9 | 100 parts ET-601 polymer; 50 parts Citric Acid; 50 parts Carbowax 6000 | Nil | Nil | Nil | Nil | Nil | 10 | 17 | 22 | 25 | 26 |
| 10 | 100 parts ET-601 polymer; 5 parts Citric Acid; 50 parts Carbowax 6000 | Nil | Nil | Nil | Nil | Nil | 10 | 15 | 19 | 22 | 25 |
| 11 | 100 parts ET-601 polymer; 50 parts Tartaric Acid; 50 parts Carbowax 6000 | Nil | Nil | Nil | Nil | Nil | 7 | 10 | 12 | 14 | |
| 12 | 100 parts ET-601 polymer; 50 parts NaHSO₄; 50 parts Polyvinyl Alcohol | Nil | Nil | Nil | Nil | Nil | 12 | 16 | 21 | 22 | 24 |
| 13 | 100 parts ET-001 polymer; 50 parts NaHSO₄; 50 parts copolymer polyoxypropylene and polyoxyethylene | Nil | Nil | Nil | Nil | Nil | 10 | 14 | 16 | 19 | 23 |

While particular embodiments of the invention have been described, it will be understood, of course, that the invention is not limited thereto since many modifications can be made, and it is intended to include within the invention any such modifications as fall within the scope of the claims.

The invention having thus been described, we claim:

1. A particulate solid water-soluble polymer composition comprising a mixture of solid water-soluble acrylamide polymer and between about 20 and 100 parts of a solid water-soluble dispersant per 100 parts of said polymer, said dispersant being selected from the group consisting of (1) dibasic aliphatic carboxylic acids, (2) monobaic hydroxy carboxylic acids, (3) dibasic hydroxy carboxylic acids, (4) tribasic hydroxy carboxylic acids, (5) dibasic polyhydroxy carboxylic acids and (6) alkali metal acid salts of sulfate, carbonate, and mono- and di-acid phosphates.

2. The composition defined in claim 1 wherein said mixture comprises finely divided particles of solid water-soluble polymer and finely divided particles of solid water-soluble dispersant.

3. The composition defined in claim 2 wherein said particulate solids are sufficiently finely divided to pass a 30 mesh screen.

4. The composition defined in claim 1 wherein said dispersant is oxalic acid.

5. The composition defined in claim 1 wherein said dispersant is citric acid.

6. The composition defined in claim 1 wherein said dispersant is tartaric acid.

7. The composition defined in claim 1 wherein said dispersant is sodium metal bisulfate.

8. The composition defined in claim 1 including in addition a solid water-soluble polyethylene glycol having a molecular weight of at least about 900 and characterized by the following generalized formula:

$$HOCH_2(CH_2OCH_2)_xCH_2OH$$

where $x$ is an integer having the value of at least 19.

9. The composition defined in claim 1 including in addition a solid water-soluble copolymer polyoxypropylene and polyoxyethylene represented by the generalized formula:

$$HO(C_2H_4O)_a(C_3H_6O)_b(C_2H_4O)_cH$$

wherein $a$, $b$, and $c$ are integers, said copolymer being characterized by a molecular weight within the range of from about 800 to about 2500 and by polyoxyethylene contents of above about 60 percent by weight.

10. The composition defined in claim 1 including in addition a solid water-soluble polyvinyl alcohol having a molecular weight within the range of from about 170,000 to 220,000.

11. The composition defined in claim 1 wherein said acrylamide polymer is a partially hydrolyzed polacrylamide having from 12 to 67 percent of the original carboxamide groups hydrolyzed to carboxyl groups and having a molecular weight of at least 500,000, said partially hydrolyzed polyacrylamide being further characterized by a viscosity of at least 6 centipoises for a 0.5 percent by weight solution thereof in an aqueous 4 percent by weight sodium chloride solution at a temperature of 25° C. as determined by an Ostwald viscosimeter.

12. A method of preparing aqueous polymer solutions, which comprises:

preparing a particulated solid mixture of a water-soluble acrylamide polymer and a solid water-soluble dispersant selected from the group consisting of (1) dibasic aliphatic carboxylic acids, (2) monobasic hydroxy carboxylic acids, (3) dibasic hydroxy carboxylic acids; (4) tribasic hydroxy carboxylic acids, (5) dibasic polyhydroxy carboxylic acids, and (6) alkali metal acid salts of sulfate, carbonate, and mono- and di-acid phosphates; and adjusting said particulated mixture with an aqueous solvent.

13. The method defined in claim 12 wherein said particulated solid mixture comprises finely divided particles of solid water-soluble polymer and finely divided particles of solid water-soluble dispersant.

14. A method of preparing aqueous polyacrylamide solutions which comprises:

preparing a particulated solid mixture of finely divided water-soluble polyacrylamide and between about 20 and about 100 parts of finely divided solid water-soluble dispersant per 100 parts of said polyacrylamide, said dispersant being selected from the group consisting of (1) dibasic aliphatic carboxylic acids, (2) monobasic hydroxy carboxylic acids, (3) dibasic hydroxy carboxylic acids, (4) tribasic hydroxy carboxylic acids, (5) dibasic polyhydroxy carboxylic acids and (6) alkali metal acid salts of sulfate, carbonate, and mono- and di-acid phosphates; and admixing said particulated mixture with an aqueous solvent.

15. The method defined in claim 14 wherein said polyacrylamide is a partially hydrolyzed polyacrylamide having from 12 to 67 percent of the original carboxamide groups hydrolyzed to carboxyl groups and having a molecular weight of at least 500,000, said partially hydrolyzed polyacrylamide being further characterized by a viscosity of at least 6 centipoises for a 0.5 percent by weight solution thereof in an aqueous 4 percent by weight sodium chloride solution at a temperature of 25° C. as determined by an Ostwald viscosimeter.

16. The method defined in claim 14 wherein said dispersant is oxalic acid.

17. The method defined in claim 14 wherein said dispersant is citric acid.

18. The method defined in claim 14 wherein said dispersant is tartaric acid.

19. The method defined in claim 14 wherein said dispersant is sodium bisulfate.

20. The method defined in claim 12 wherein said particulated solid mixture also includes a material selected from the group consisting of (1) solid water soluble polyethylene glycol having a molecular weight of at least about 900 and characterized by the following generalized formula:

$$HOCH_2(CH_2OCH_2)_xCH_2OH$$

where $x$ is an integer having the value of at least 19; (2) solid water soluble copolymer polyoxypropylene and polyoxyethylene represented by the generalized formula:

$$HO(C_2H_4O)_a(C_3H_6O)_b(CH_2H_4O)_cH$$

wherein $a$, $b$, and $c$ are integers, said copolymer being characterized by a molecular weight within the range of from about 800 to about 2500 and by polyoxyethylene contents of above about 60 percent by weight; and (3) solid water soluble polyvinyl alcohol having a molecular weight within the range of from about 170,000 to 220,000.

21. The method defined in claim 14 wherein said particulated solid mixture also includes a material selected from the group consisting of (1)) solid water-soluble polyethylene glycol having a molecular weight of at least about 900 and characterized by the following generalized formula:

$$HOCH_2(CH_2OCH_2)_xCH_2OH$$

where $x$ is an integer having the value of at least 19; (2) solid water-soluble copolymer polyoxypropylene and polyoxyethylene represented by the generalized formula:

$$HO(C_2H_4O)_a(C_3H_6O)_b(C_2H_4O)_cH$$

wherein $a$, $b$, and $c$ are integers, said copolymer being characterized by a molecular weight within the range of from about 800 to about 2500 and by polyoxyethylene contents of above about 60 percent by weight; and (3) solid water-soluble polyvinyl alcohol having a molecular weight within the range of from about 170,000 to 220,000.

22. The composition defined in claim 1 wherein said acrylamide polymer is a partially hydrolyzed polyacrylamide having some of the original carboxamide groups hydrolyzed to carboxyl groups.

References Cited

UNITED STATES PATENTS

| | | | |
|---|---|---|---|
| 2,486,804 | 11/1949 | Seymour et al. | 260—29.6 |
| 3,216,962 | 11/1965 | Gatza | 260—29.6 |
| 3,234,163 | 2/1966 | Schurz et al. | 260—29.6 |
| 3,249,572 | 5/1966 | Davis et al. | 260—29.6 |
| 2,883,298 | 4/1959 | Meadows | 260—29.6 |
| 3,087,920 | 4/1963 | Suzumura et al. | 260—29.6 |
| 3,092,600 | 6/1963 | Ozawa et al. | 260—29.6 |
| 3,152,102 | 10/1964 | Suzumura et al. | 260—29.6 |
| 3,251,814 | 5/1966 | Gentile | 260—29.6 |

SAMUEL H. BLECH, *Primary Examiner.*

W. J. BRIGGS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,137　　　　　　　　　　　　September 17, 1968

Paul W. Fischer et al.

It is certified that error appears in the above identified patent and that said Letters Patent are hereby corrected as shown below:

Column 10, line 34, "adjusting" should read -- admixing --.

Signed and sealed this 10th day of February 1970.

(SEAL)
Attest:

Edward M. Fletcher, Jr.　　　　　　　　　WILLIAM E. SCHUYLER, JR.
Attesting Officer　　　　　　　　　　　　Commissioner of Patents